United States Patent [19]
Woolley

[11] Patent Number: 5,149,165
[45] Date of Patent: Sep. 22, 1992

[54] STRUCTURES FOR LIFTING OUTBOARD SIDE OF SEAT OF MOTOR VEHICLE DURING SIDE IMPACT COLLISION

[76] Inventor: Ronald L. Woolley, 2510 N. University Ave., Provo, Utah 84604

[21] Appl. No.: 696,103

[22] Filed: May 6, 1991

[51] Int. Cl.⁵ .............................................. B60N 2/42
[52] U.S. Cl. .................................. 296/68.1; 180/274; 297/216; 280/748
[58] Field of Search ...................... 296/68.1; 180/274; 297/216; 280/748

[56] References Cited

U.S. PATENT DOCUMENTS

| | | | |
|---|---|---|---|
| 2,736,566 | 2/1956 | Hartl | 296/68.1 X |
| 2,970,862 | 2/1961 | Racine | 296/68.1 |
| 3,743,347 | 7/1973 | Shaw | 296/68.1 X |
| 3,998,291 | 12/1976 | Davis | 296/68.1 X |
| 4,396,220 | 8/1983 | Dieckmann et al. | 296/68.1 |
| 4,966,388 | 10/1990 | Warner et al. | 280/734 X |

FOREIGN PATENT DOCUMENTS 2314990  10/1974  Fed. Rep. of Germany ..... 296/68.1

*Primary Examiner*—Dennis H. Pedder
*Attorney, Agent, or Firm*—Terry M. Crellin

[57] ABSTRACT

A safety system used in motor vehicles for raising the outboard side of a passenger seat upon side impact of the vehicle by another object. The system comprises a sensor for detecting impact of the side of the vehicle by another object. The sensor activates a trigger mechanism that in turn activates a device for raising the outboard side of the seat. The outboard side of the seat, in addition to moving upwardly may also move inwardly in an arc toward the longitudinal center portion of the interior of the vehicle.

2 Claims, 2 Drawing Sheets

STRUCTURES FOR LIFTING OUTBOARD SIDE OF SEAT OF MOTOR VEHICLE DURING SIDE IMPACT COLLISION

BACKGROUND OF THE INVENTION

1. Field of the Invention

The present invention relates to a safety system used in motor vehicles for protection of passengers in the motor vehicle from side impact collisions. In particular, the invention relates to a system used in automotive vehicles for lifting the outboard side of a seat upwardly when a collision results in impact of the side of the motor vehicle.

2. State of the Art

Restraint devices for restraining occupants of automotive vehicles involved in frontal collisions are of course well known. Such systems employ seat belts and more recently developed air bags which are inflated rapidly in response to a collision. Seat and shoulder belts restrain the occupant and inflated air bags provide a cushioning restraint for the occupants from impact with the steering wheel, instrument panel and windshield of the vehicle. For examples of air bag systems see U.S. Pat. Nos. 3,642,303; 3,758,133 and 4,097,065.

In U.S. Pat. No. 3,998,291, issued Dec. 21, 1976, a safety device for the seat of a motor vehicle is suggested wherein in the event of a front end collision, the seat rotates or tilts backwardly along an axis transverse of the longitudinal axis of the motor vehicle. The tilting seat allegedly presses the passenger within the tilted, V-shaped form resulting from the tilting of the seat and restrains the passenger from being accelerated forwardly against the dashboard, steering column and windshield. The tilting seat of U.S. Pat. No. 3,998,291 would offer no advantage in a side impact collision.

The devices discussed previously, including seat belts, inflatable restraint systems and rearwardly tilting seats of the prior art, generally do little to provide essential protection to an occupant of a vehicle during accidents involving impact of the side of the vehicle. During side impact collisions, seat belts and air bags do little more than prevent occupants from impacting each other and prevent total ejection of an occupant from the vehicle. The rearwardly tilting seat, unless used with seat belts has little or no benefit in a side impact collision. In a side impact collision the occupant is subject to dangerous contact with the side of the vehicle next to which the occupant is seated, and the distinct possibility exists of the impacting vehicle penetrating and making impact with the chest and abdomen area of the occupant. Conventional restraint systems have not adequately addressed these problems.

Some limited protection in side impact collisions is afforded by conventional padding applied to the interior surfaces of the side panel, but space and comfort limitations along the interior of the side panel preclude use of sufficient padding depth to be of significant value in a moderate-to-severe accident. In U.S. Pat. No. 3,791,667, it was proposed to provide a housing recessed in a side panel of a vehicle, with the housing having an open side facing the interior of the vehicle. An elastomeric, stretchable membrane was secured over the open side of the housing, having its peripheral edges sealed to the housing. In a collision, gas under pressure was delivered to the housing to expand the membrane toward the interior of the vehicle to form a cushion for the torso of an occupant seated adjacent thereto. The system of U.S. Pat. No. 3,791,667, however, provides only cushioning of the occupants' body. There is no attempt at elevating the occupant and moving the occupant away from the side of the impacted vehicle so as to minimize injury due to hitting the side of the impacted vehicle or of being struck by the impacting vehicle if the impacting vehicle penetrates the side of the impacted vehicle.

In U.S. Pat. No. 4,966,388, an air bag restraint system which can be deployed relatively instantaneously from the side panel of the vehicle to offer essentially immediate padding and restraint for the entire flank of the occupant seated adjacent to such side panel. An attempt is made to initiate movement of the occupant away from the impacted side of the vehicle, but there is no suggestion of elevating the passenger such that impact between the passenger and his own vehicle or between the passenger and the impacting vehicle will be in the area of the underside of the buttocks of the passenger rather than the passenger's chest and thorax or at least lower on the body than would have otherwise taken place.

SUMMARY OF THE INVENTION

In a side impact collision, injury sustained by a passenger can be mitigated by raising the seated height of the passenger relative to the height of the top of the bumper of the intruding vehicle. If the passenger can be raised above the height of the bumper of the intruding vehicle, the main force of the impact will be sustained by the passenger's buttocks rather than the chest and thorax portion of the passenger's torso. If the impacting vehicle penetrates the side of the passenger's vehicle, it is beneficial to raise the seated height of the passenger so that the passenger may ride above the bumper of the impacting vehicle. Although not insuring absence of injury, a passenger who is elevated above the penetration of the impacting vehicle's bumper will sustain less severe injury than a passenger who is seated such that his torso is in direct line of the bumper of the impacting vehicle.

Further, the upward and inwardly rotated movement of the passenger's seat produces a more favorable interaction with the contact force. The passenger is lifted and given a rotating movement toward the central portion of the interior of the vehicle. This moves the passenger and imparts a velocity away from the impacted side of the vehicle and away from the penetrating bumper of the impacting vehicle. The elevated seat receives the major force from the impacting vehicle and undergoes compression prior to impact between the passenger and the side of the vehicle. The frictional interaction between the passenger and the seat is increased and the passenger tends to assume the velocity of the seat, thereby lessening acceleration into the impacted side of the vehicle. In addition, the upward movement coupled with the rotation toward the center of the vehicle elevates the shoulder of the passenger upwardly to increase the probability of contact with the top of the window frame. This shoulder contact reduces head contact probability and the possibility of dangerous impact of the head of the passenger with side window or the top of the window frame. The passenger's head and thorax move inboard of the vehicle to a more relatively safe position.

Elevation and rotation of the hip decreases the rib to pelvis spacing providing increased abdominal protection.

It is thus a principal objective to provide methods and apparatus for raising the outboard side of a passenger's seat in a motor vehicle upwardly and of rotating the seat about an axis that extends longitudinally of the vehicle, with the axis being displaced inwardly from the outboard side of the passenger's seat, with the axis preferably being located along the inboard side of the passenger's seat in the vicinity of the central, longitudinal plane of the vehicle. Additional objects and features of the invention will become apparent from the following detailed description, taken together with the accompanying drawings.

THE DRAWINGS

A preferred embodiment of a system for raising and rotating a seat of a motor vehicle in accordance with the present invention representing the best mode presently contemplated of carrying out the invention are illustrated in the accompanying drawings in which.

DETAILED DESCRIPTION OF THE ILLUSTRATED EMBODIMENT

Figure 1:
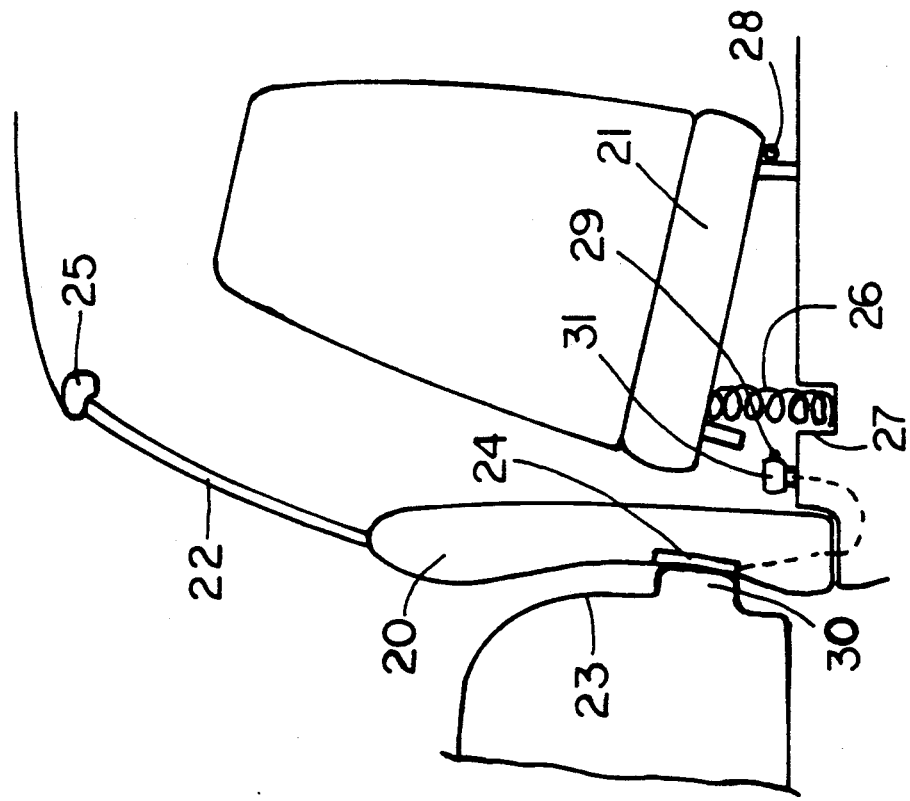
FIG. 1 is a simplified, diagramatical section through a motor vehicle behind a seat thereof looking at the back of the seat, with the figure showing a seat raising and rotating system in accordance with the present invention.

Referring to the drawings, a safety system is shown which provides means for raising the outboard side of a passenger seat upwardly while simultaneously rotating the seat about an axis parallel to the longitudinal, central axis of the motor vehicle. The axis of rotation is displaced inboard from the outboard side of the seat. The seat is raised and rotated in a collision involving side impact of the occupant's vehicle with another object such as another vehicle. As illustrated, the occupant's vehicle, is a conventional automobile having a side panel 20 located adjacent to the end of a seat 21 upon which the passenger or occupant can be seated. The side panel 20, as illustrated, is a side door of the automobile and will be referred hereinafter as a door panel. It should be recognized, however, that the invention is applicable to a side panel of an automotive vehicle generally and is not restricted to a door panel or to any particular type vehicle. For instance, the invention could be applied to the side panels adjacent to the back seat of a conventional two door automobile, as well as doors and side panels of trucks. In the illustrated embodiment, a window 22 is located at the upper end of the door panel 20. A roof rail 25 is positioned adjacent to an upper side of the window 22.

The lifting and rotating system of the present invention includes means that can be activated by impact of a foreign object with the side of the motor vehicle to trigger a force applied to the outboard side of the seat 21 to lift the outboard side of the seat upwardly from the floor of the interior of the motor vehicle. The seat 21 rotates about an axis 28 that is positioned inboard of the interior of the motor vehicle.

As illustrated, the system comprises a sensing device 24 in the side panel 20 of the motor vehicle that is capable of sensing an impact of another object with the side of the vehicle. The sensor 24 can be a contact sensor such as shown in U.S. Pat. No. 4,966,388 or any other device that is capable of sensing impact and sending a signal of such impact.

Figure 2:
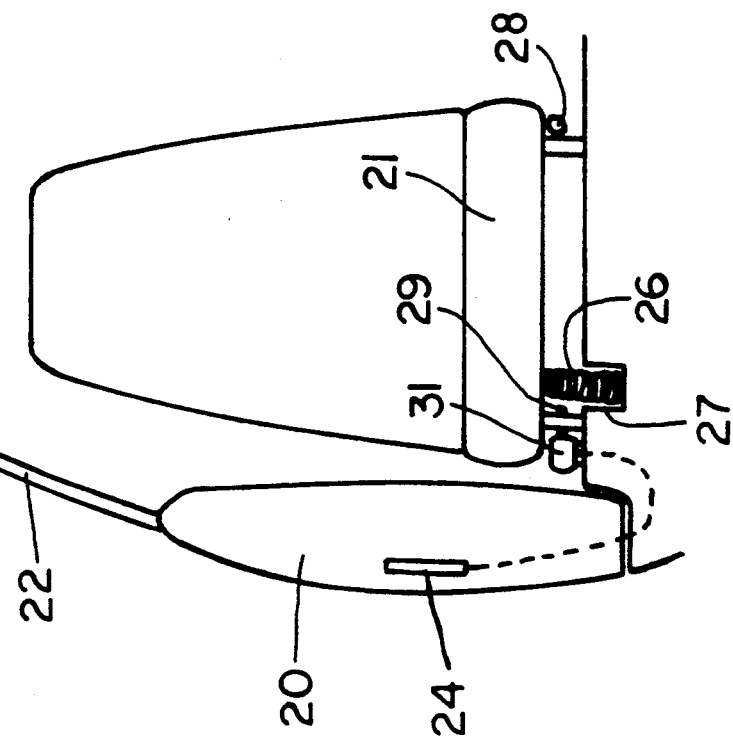
FIG. 2 is a view similar to that of FIG. 1 but showing an impacting vehicle colliding with the side of the motor vehicle whereby the seat is activated to raise and pivot into the position shown.

Upon impact of the side 20 of the vehicle, such as by the bumper 30 of another vehicle as shown in FIG. 2, the sensor instantaneously sends a signal, such as an electrical potential, to a trigger means 31. The trigger means releases the outboard side of the seat 21 upwardly from the floor of the interior of the vehicle.

Figure 3:
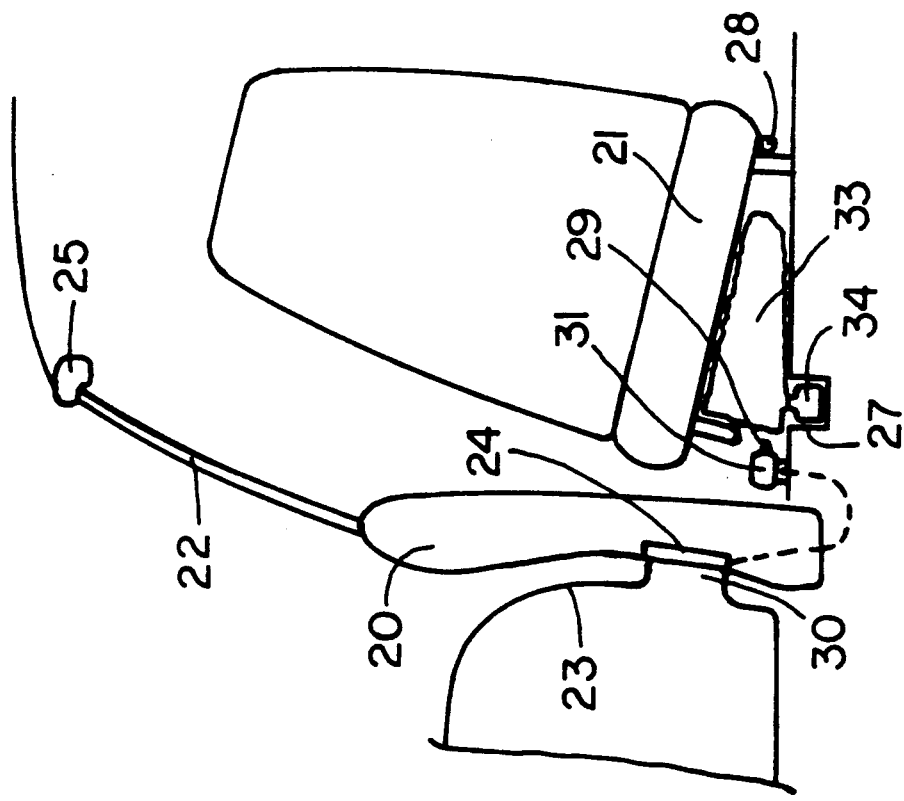
FIG. 3 is a view similar to that of FIG. 2 but showing an air bag as the means for raising the seat.

As illustrated, one or more springs 26 can be positioned so as to exert their spring force on the outboard side of the seat 21. The springs 26 can be coils springs that are contained in a well 27 in the floor as shown in the drawings, Although not shown in the drawings, the springs could also be leaf springs. As shown in FIG. 3, an inflatable type device is shown as the means for lifting the seat. In the embodiment shown in FIGS. 1 and 2, the springs 26 are held in compression so as to exert an upwardly directed force against the outboard side of the seat 21. The trigger means 31, when not triggered by a signal from the sensor 24, acts to retain the outboard side of the seat 21 in its normal operating position mounted against the floor of the interior of the vehicle. The trigger 31 is equipped with suitable interlocks to prevent inadvertent actuation.

In a preferred embodiment of the invention, the trigger means 31 may comprise a solenoid activated latch 29 that, under normal conditions makes latching engagement with the outboard side of the seat 21. When activated, such as by the reception of potential from the sensor 24, the solenoid of the trigger means 31 forcefully retracts the latch 29 from engagement with the seat 21. The outboard side of the seat 21 is instantaneously pushed upwardly by the compressed springs 26 when the trigger means releases the latch 29 from engagement with the seat 21. The seat 21 pivots about a pivot axis 28 to the position as shown in FIG. 2.

As can be seen from FIG. 2, elevating the outboard side of the seat 21 increases the probability that the maximum penetration of the impacting object will be below the occupant of the seat and directed to the underside of the buttocks of the occupant. Further, the force of the intruding bumper 30 and other structure 23 of the impacting vehicle if acting on the occupant will be directed to a lower position of the occupant's body. The probability of direct contact to the chest and thorax is greatly reduced by the increase in elevation of the occupant as well as by the rotation of the seat and the occupant.

Rotation of the seat 21 about the inboard side of the seat creates a geometry that promotes additional rotation of the seat as intrusion of the impacting article progresses. The bumper 30 of the impacting vehicle can well engage the side or bottom side of the seat 21 and act to further rotate the seat 21 as well as elevate the outboard side of the seat. This additional rotation and elevation are favorable for the same reason that the initial elevation and rotation of the seat 21 is beneficial. Maximum excursion is limited by components of the spring 26. Further, when the bumper 30 of the impacting vehicle moves the seat 21 upwardly and inwardly, the seat 21 itself becomes an energy absorbing cushion between the intruding bumper and the occupant of the seat 21.

The initial rotation of the seat 21 about the inboard axis 28 is beneficial in moving the occupant's head and thorax inwardly away from the intruding article, and as mentioned above, increases the probability that first contact to the occupant will be lower on the body, with the line of action being through the seat cushion. In addition, the shoulder of the occupant is raised such that the shoulder may come in contact with the top of the window frame rather than the occupant's head making such contact. Further, the vertical acceleration of the occupant lowers the outboard arm and shoulder of the occupant prior to contact of the occupant with the side 20 of the vehicle. Lowering of the outboard arm of the occupant results in the upper arm being more vertically positioned to give protection to the occupant's thorax. For drivers with the outboard hand on the steering wheel, the ribs are exposed to contact with the side 21 of the vehicle. The vertical acceleration of the driver repositions the driver's outboard arm in a much more favorable position to provide protection to the drivers ribs.

The system of the present invention works ideally with individual seats such as bucket seats that have their inboard side adjacent to the longitudinal central axis of the motor vehicle. However, the system will operate with bench seats. The bench seat can rotate about its opposite end, or preferably, a predefined weakness can be provided in the central portion of the frame of the bench seat. Buckling can then occur at the weak areas of the frame to allow the bench seat to buckle near its center. By buckling near the center of the seat, the bench seat would operate essentially like individual seats described above.

Means other than the compression springs illustrated in FIGS. 1 and 2 could be used to propel the outboard side of the seat 21 upwardly. An Inflatable member such as an air bag 33 (FIG. 3) could be used that would expand rapidly upwardly to force the outboard side of the seat 21 upwardly. Inflation means 34 which are used in inflating conventional air bags and are well known in the art rapidly inflates the air bag 33 upon being triggered by impact of the side of the vehicle. It is also conceivable that a combination of preloaded spring means and pneumatic lift expander means could be used. The springs would provide initial instantaneous upward acceleration, with the pneumatic expander applying supplemental force to raise and rotate the seat. If the spring and expander were triggered by separate devices, the spring could be deployed in minor side impacts, with the spring and pneumatic expander being deployed in more severe, side impacts.

Although a preferred embodiment of a system for raising the outboard side of a seat of a motor vehicle and for rotating the seat inwardly toward the interior of the vehicle in accordance with the invention has been illustrated and described, it is to be understood that the present disclosure is made by way of example and that various other embodiments are possible without departing from the subject matter coming within the scope of the following claims, which subject matter is regarded as the invention.

I claim:

1. A system used in motor vehicles for raising the outboard side of a passenger seat upon side impact of the vehicle by another object, said system comprising
   sensing means for detecting impact of the side of the vehicle by another object;
   means for activating a trigger mechanism when the sensing means detects impact of the side of the vehicle;
   means for raising the outboard side of a seat adjacent to the side of the vehicle that has been impacted, wherein the means for raising the outboard side of the seat comprises at least one spring mounted between the seat and the floor of the vehicle so as to exert force against the outboard side of the seat; and
   the trigger mechanism includes a latch which, when the trigger mechanism is not activated, holds the outboard side of the seat firmly mounted to the floor of the vehicle, and when the trigger mechanism is activated, the latch releases allowing the outboard side of the seat to move upwardly under the force of said spring.

2. A system used in motor vehicles for raising the outboard side of a passenger seat upon side impact of the vehicle by another object, said system comprising
   sensing means for detecting impact of the side of the vehicle by another object;
   means for raising the outboard side of a seat adjacent the side of the vehicle that has been impacted, wherein the means for raising the outboard side of the seat comprises an air bag inflation device mounted between the seat and the floor of the vehicle so as to exert an upward force against the outboard side of the seat when the air bag inflation device is inflated; and
   means for inflating the air bag inflation device in response to detection of impact of the side of the vehicle by said sensing means.

* * * * *